(12) United States Patent
Wördemann

(10) Patent No.: US 7,088,909 B1
(45) Date of Patent: Aug. 8, 2006

(54) METHOD AND APPARATUS FOR THE RECORDING THE REPRODUCTION OF TRANSMITTED PROGRAMME CONTRIBUTION

(75) Inventor: Hermes Wördemann, Hameln (DE)

(73) Assignee: Deutsche Thomas-Brandt GmbH, Villingen-Schwenningen (DE)

(*) Notice: Subject to any disclaimer, the term of this patent is extended or adjusted under 35 U.S.C. 154(b) by 0 days.

(21) Appl. No.: 09/326,883

(22) Filed: Jun. 7, 1999

(30) Foreign Application Priority Data

Jun. 24, 1998 (DE) .............................. 198 28 072

(51) Int. Cl.
*H04N 5/91* (2006.01)
*H04N 7/025* (2006.01)

(52) U.S. Cl. .............................. 386/69; 386/55; 725/32

(58) Field of Classification Search ............... 386/69, 386/68, 46, 1, 6, 4, 52, 55, 124, 125, 126, 386/45, 40; 360/13; 725/22, 25, 28, 32
See application file for complete search history.

(56) References Cited

U.S. PATENT DOCUMENTS

| 5,333,091 | A   |   | 7/1994  | Iggulden et al. |         |
|-----------|-----|---|---------|-----------------|---------|
| 5,692,093 | A   |   | 11/1997 | Iggulden et al. |         |
| 6,208,805 | B1  | * | 3/2001  | Abecassis       | 386/126 |
| RE37,881  | E   | * | 10/2002 | Haines          | 386/92  |
| 2003/0154478 | A1 | * | 8/2003 | Hassell et al.  | 725/39  |

FOREIGN PATENT DOCUMENTS

| DE | 3217557 | 5/1982  |
| DE | 4434034 | 3/1996  |
| EP | 0903742 | 3/1999  |
| EP | 0903743 | 3/1999  |
| WO | 9608921 | 3/1996  |
| WO | 9706531 | 2/1997  |
| WO | 9746007 | 12/1997 |

OTHER PUBLICATIONS

Search Report for European Patent Appln. No. 99 11 1450.
Fletcher, Peter: Multimedia Decoder Chip Adds a Hot 'SPARC' to DVD, in Electronic Design, May 13, 1996, H.10, S.59,60,64.
Search Report for German Patent Appln. No. 198 28 072.6.

* cited by examiner

*Primary Examiner*—Robert Chevalier
(74) *Attorney, Agent, or Firm*—Joseph J. Laks; Robert B. Levy; Joseph J. Kolodka

(57) ABSTRACT

In the context of recording program contributions, in particular television transmissions, it is frequently undesirable for the advertising blocks broadcast during the transmission also to be recorded and displayed in the event of subsequent reproduction. The invention is concerned with the problem of reliably suppressing such advertising blocks in the event of subsequent reproduction. To that end, it proposes firstly recording the transmission including the broadcast advertising blocks and then carrying out a search during which the beginning and the end of the advertising blocks (WU1–WU3) are marked. The information items (CIDN1, CDIN3) thus obtained are used in order either to subsequently record associated navigation data (CN1–CNi+3) on the storage medium (43), the said navigation data ensuring that the stored advertising blocks are masked out in the event of reproduction, or resorting of the recorded data cells is performed, in the case of which the data of the program contribution are then packed as compactly as possible and the data cells for the advertising blocks are eliminated in this way.

6 Claims, 4 Drawing Sheets

1. ◁ ▷ ▢

2. ◁◁

3. ▷▷ ⏸ ← ▷▷ ⏸ →

4. →◇

5. ▢

METHOD AND APPARATUS FOR THE RECORDING THE REPRODUCTION OF TRANSMITTED PROGRAMME CONTRIBUTION

The invention relates to a method and an apparatus for the recording and reproduction of a transmitted programme contribution, such as e.g. a broadcast television or radio transmission.

BACKGROUND OF THE INVENTION

The invention is based on a method for the recording and reproduction of transmitted programme contributions of the generic type of the independent Claim 1. The recording and reproduction of programme contributions has long been known from video recorder technology. With the growth of commercial television, it is noticeable that very many advertising interruptions are inserted into a broadcast television transmission. Therefore, when such a television transmission is recorded, it is very often undesirable for the advertising blocks to be concomitantly recorded. However, since unambiguous signalling of advertising blocks is not made available by most programme providers, it is a difficult problem to reliably identify such advertising blocks actually during recording and to prevent them from being recorded. Admittedly, there are also approaches which attempt to automatically identify the broadcasting of an advertising block and correspondingly suppress its recording. These approaches are mainly based on an analysis of the picture contents, e.g. in such a way that the omission of the programme provider's logo during the broadcasting of advertising is detected or, in the case of a television transmission being broadcast in the 16:9 format, a format changeover during the advertising interruption is detected. As a further criterion, a check is also frequently made to see whether an increased loudness level is received, since the sound is often set to be louder in advertising blocks. However, all these known methods for automatically identifying advertising blocks do not operate with 100% reliability since, in particular, the programme providers from time to time change the broadcasting behaviour in the case of advertising blocks, with the result that the criteria checked are not always reliable criteria for the identification of an advertising block.

SUMMARY OF THE INVENTION

The object of the invention is to specify a method for the recording and reproduction of a transmitted programme contribution which enables programme parts, such as advertising blocks, to be reliably masked out, so that undesirable masking out of scenes of the programme contribution does not occur. The object is achieved by means of the features of the independent Claim 1.

The solution according to the invention, in accordance with Claim 1, consists in the fact that firstly the programme contribution including the programme parts such as advertising blocks is recorded on a storage medium. The process of recording is then followed by the starting of a search in which the beginning and the end of each undesired programme part are sought and associated information items are collected in a store, which are then used in order either to subsequently record associated navigation data for suppressing the reproduction of these programme parts on the storage medium or to perform resorting of the recorded data cells, in the case of which the data of the programme contribution succeed one another in a manner such that they are packed as compactly as possible without interruption by undesired programme parts.

The recording of the undesired programme parts as well initially ensures that all sections of the programme contribution which are of interest are recorded. The implementation of the search after the recording process then allows either manual determination of the position e.g of the advertising blocks, or else automatic determination of the position e.g. of the advertising blocks by means of complicated algorithms, since, after all, sufficient time is then available for the search.

The information items obtained with regard to the position e.g. of the advertising blocks may then alternatively be used in order additionally to record a number of items of navigation data on the same storage medium, which navigation data then ensure, in the event of reproduction, that e.g. the advertising blocks, although they have been stored, are skipped, or resorting of the recorded data cells is performed, in the case of which the data of the programme contribution are given a new arrangement, so that the data cells for e.g. the advertising blocks are eliminated.

Advantageous developments and improvements of the method specified in Claim 1 are possible by virtue of the measures evinced in the dependent Claims 2–6.

In one refinement of the invention, the information items with regard to the beginning and end e.g. of an advertising block are stored in the form of jump information on the storage medium, to be precise at the location of the beginning e.g. of the advertising block, with the result that, in the event of reproduction, the read-out unit is controlled in such a way that it moves to the location of the next data cell after e.g. an advertising block and reads out the next data at the said location. In this case, depending on the storage medium used, a pause may occur in the reproduction if the new positioning of the read-out unit takes a relatively long time. This will be the case predominantly with magnetic tapes, since the latter have to be wound forwards to the corresponding location.

The claimed solution can be used very advantageously, however, in connection with the very recently disclosed storage medium of the rewritable DVD disc (DVD-RAM). This is because the read-out unit can be repositioned relatively rapidly in that case, so that relatively long pauses do not occur.

In an advantageous development of the invention, instead of the jump command, provision may be made for a navigation table to be subsequently stored, in which there is specified the order in which the data cells of the DVD disc that have been written to are intended to be read out in the event of a reproduction operation, and in which case the data cells comprising data from e.g. the advertising blocks are not entered into this table. Such navigation tables are already provided in any case in the DVD standard for DVD-ROM devices, with the result that this solution can also be applied to the DVD-RAM devices without additional development effort. This solution can be used even with DVD recordable devices, if a reserved area is kept free for the navigation table during the first recording process.

In the case of the alternative, in which resorting of the recorded data cells is subsequently effected, there is, on the one hand, the solution option of using one and the same storage medium and accordingly of overwriting the data cells for e.g. the advertising blocks with corresponding data cells of the programme contribution. For this purpose, it will be necessary, of course, to provide sufficient buffer storage and, moreover, the operation will take some time since frequent repositioning of the read-out unit and/or of the storage medium is necessary.

A simpler, but more expensive solution is specified, therefore, in Claim 5, in which a second recording device is used during the resorting, in which device a further storage medium is inserted and on which device the programme contribution is then recorded without the advertising blocks.

The invention is not restricted to programme parts such as advertising blocks; for example, programme parts which are not intended to be viewed by particular groups of people can also be masked out in accordance with the invention. The operation of subsequent masking out can be reversed by cancelling the reading data.

An improvement can additionally be achieved if measures are taken to obtain a seamless transition from a video scene prior to advertising insertion to the subsequent scene after the video insertion. Specifically, it is customary for an advertising block to be followed firstly by the repetition of a number of scenes already broadcast previously. Only then is the action resumed. Of course, this is undesirable for simultaneous recording from which the advertising has been purged. In the field of digital picture coding, such measures have been disclosed under the keywords of MPEG Splicing. A standard has even been disclosed for this purpose, named the SMPTE Splicing Standard.

Advantageous measures for an apparatus for the recording and reproduction of a programme contribution are additionally specified in Claims 7 to 9.

BRIEF DESCRIPTION OF THE DRAWING

Exemplary embodiments of the invention are illustrated in the drawings and are explained in more detail in the description below. In the figures.

DESCRIPTION OF THE PREFERRED EMBODIMENTS

Figures 1, 3:
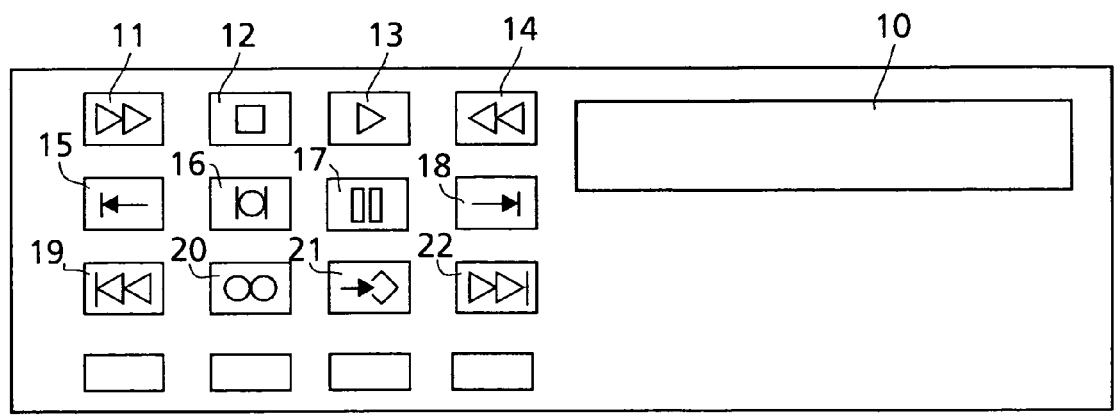
FIG. 1 shows the front view of a recording and reproduction device according to the invention.
FIG. 3 shows the temporal sequence of the recording method according to the invention.

The invention is explained using the example of a DVD-RAM device. Such DVD-RAM devices are currently at the development stage, the first prototypes already having been presented. The front view of such a DVD-RAM device is illustrated in FIG. 1. The reference numeral 10 designates the loading compartment into which the DVD-RAM disc is inserted. Furthermore, a number of operating keys are illustrated. In this case, the illustration has been restricted to the essential operating keys which are necessary, in particular, for the recording and reproduction method according to the invention. The reference numeral 11 designates the fast forward key, the reference numeral 12 designates the stop key, the reference numeral 13 designates the playback key, the reference numeral 14 designates the fast reverse key, the reference numeral 15 designates the marking key for the start of an advertising block, the reference numeral 16 designates the recording function key, the reference numeral 17 designates the pause key, the reference numeral 18 designates the marking key for the end of an advertising block, the reference numeral 19 designates a key for title skipping-back, the reference numeral 20 designates a key for continuous repetition, the reference numeral 21 designates the key which initiates a programming function, and the reference number 22 designates the key for skipping forward to the next title. Further keys with other functions may be provided, but are not considered here in any specific detail.

The way in which the data are stored during the recording of a programme contribution on the DVD disc is explained in more detail below. To that end, the temporal sequence of the data flow during recording is illustrated in the upper part of FIG. 2, marked by the reference numeral 30. The recording begins at the instant $t_0$. Three advertising interruptions are present in the course of the film being broadcast. The first film section is designated by the reference symbol FA1.

Figure 2:
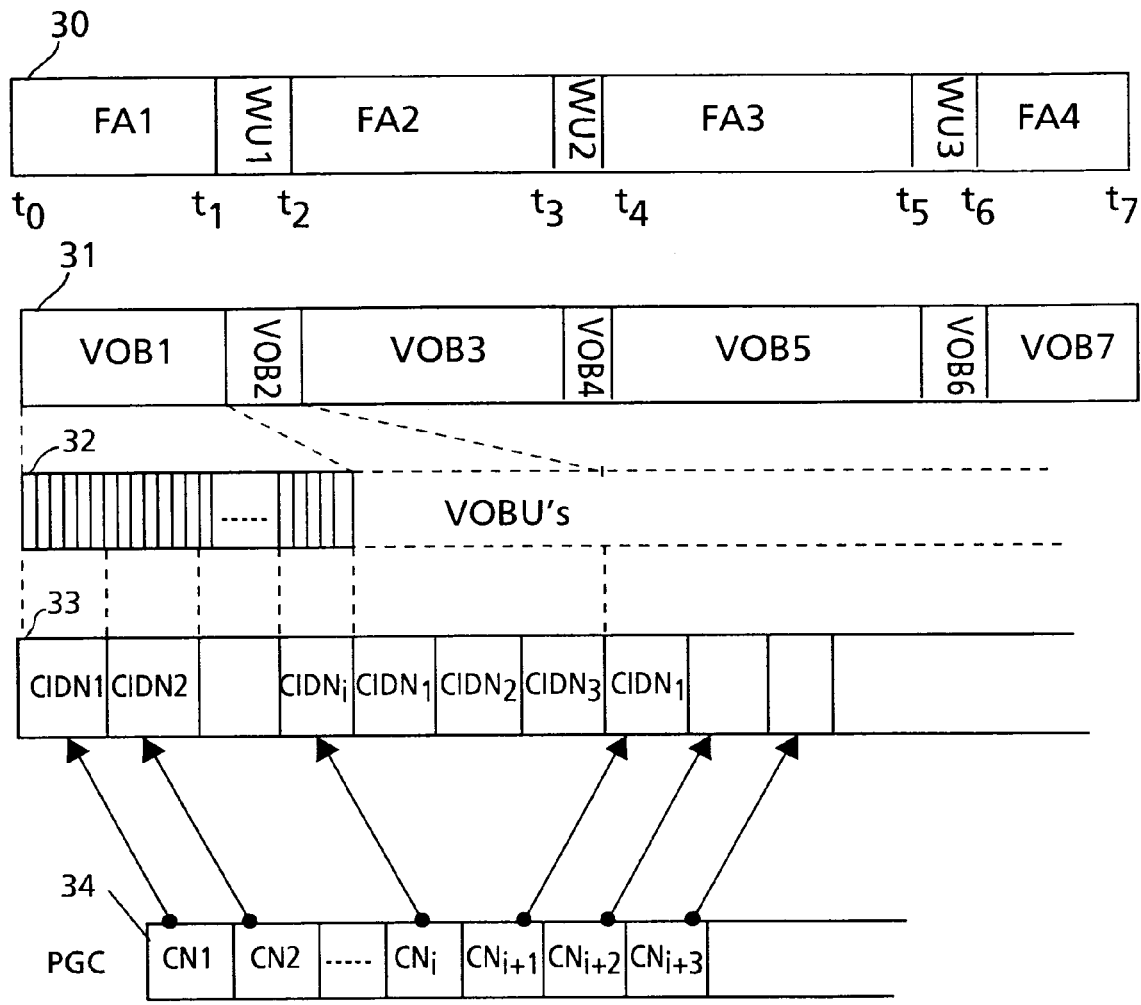
FIG. 2 shows an example of a navigation table and the function thereof.

The first advertising interruption takes place at the instant $t_1$. The first advertising block is designated by the reference symbol WU1. At the instant $t_2$, the first advertising block is ended and the second film section FA2 is transmitted. The second advertising interruption WU2 begins at the instant $t_3$. The said second advertising interruption is ended at the instant $t_4$, and the third film section FA3 is recorded. The third advertising interruption WU3 begins at the instant $t_5$ and, at the instant $t_6$, the fourth film section FA4 is recorded and is ended at the instant $t_7$, which also corresponds to the end of the film. Data are recorded on the DVD disc during the entire period of time $t_0$–$t_7$. In this case, the DVD disc is divided into different logical data units. The entire logical data structure of a DVD disc is defined in the DVD standard, DVD specifications for read-only disc, part 3 video specification, version 1.0, August 96 and, therefore, need not be explained specifically in all its details here. In this regard, reference is expressly made to the DVD standard. For the purpose of elucidation, FIG. 2 illustrates, at reference numeral 31, that the entire recorded data stream is divided into so-called video objects (VOB). Seven video objects VOB1–VOB7 are provided in this exemplary case. They correspond to the individual film sections FA1–FA4 and advertising interruptions WU1–WU3. However, this division is not mandatory; the data stream may also be divided into video objects in a different manner. This is dependent on the implementation of the DVD recording device. That section in FIG. 2 which is designated by the reference number 32 then illustrates that each video object is divided, for its part, into a multiplicity of video object units (VOBU). The DVD standard stipulates here that such a video object unit contains the audio and/or video data for a period of between 0.4 and 1.2 seconds.

These video object units are, at the same time, the smallest logical data units that can be individually addressed on the DVD disc. The data of a plurality of successive video pictures are then stored in a video object unit. For example, the data of a Group of pictures GOP may be stored in a video object unit. In this case, such Groups of pictures represent closed units which can be coded separately and also decoded separately. However, the coding method will not be discussed in any detail here since it corresponds to the known MPEG video coding and it will not be a matter of further importance here in the following text.

The so-called data cells are a further logical unit on the DVD disc. The division of the recorded data stream into data cells is illustrated at reference numeral 33 in FIG. 2. In this case, there are always five video object units combined in a data cell. The data cells are chosen to have the same size in this example. However, the division illustrated is meant only as an example; it may also be chosen differently, however, in the context of the rules drawn up in the DVD standard. As illustrated in FIG. 2, each data cell is provided with an identification number $CIDN1–CIDN_{ii}$, etc., and can be individually addressed. There are both data cells for the data of the film sections FA1–FA4 and data cells for the data of the advertising interruptions WU1–WU3. In this case, the data cells of each video object are consecutively numbered individually. The numbers of the data cells of the first video object read e.g. 1–i. Since only 3 data cells are provided for the first advertising interruption, their numbers only run from 1–3. The abbreviation CIDN in FIG. 2 in this case stands for the cell identification number within a video object.

In addition, one or more navigation tables may now be provided on the DVD disc, in which table(s) there is specified the order in which the data are intended to be read out, and are correspondingly intended to be decoded and reproduced, in the event of reproduction. This function is abbreviated to PGC (Program chain) in the abovementioned DVD standard. Program chain information items (PGCI) are in this case understood to mean navigation commands, or the order in which data cells are reproduced. The invention utilizes this possibility of inputting an order for the reproduction of data cells for masking out advertising blocks.

One example of this is shown by the lower part of FIG. 2 at the reference number 34. Specifically, this illustrates the table in which there is specified the order in which the individual data cells are intended to be reproduced. It is clearly evident that firstly all the data cell identification numbers of the first video object are entered into this table in the cells CM1–CMi. However, an entry which points to the first data cell of the third video object is made in the next cell Cmi+1. This means that the data cells for the second video object, containing the data of the first advertising interruption, are skipped and, after the reproduction of the last data cell of the first film section, the reproduction of the first data cell of the second film section begins directly. The further entries are then meant for the next data cells of the second film section. The data cells for the second and third advertising interruptions are then also masked out in the same way.

The drawing up of such a navigation table then has the effect of stipulating that, in the event of reproduction, no advertising interruptions are reproduced even though the corresponding data are stored. In order to implement the solution in the manner proposed, it should be agreed in the DVD-RAM standard that such navigation tables can also be written subsequently to a correspondingly reserved area. This does not, however, involve a particularly great effort since, after all, such navigation tables are already provided in any case in the DVD-ROM standard and it is also planned to take them into consideration in the case of DVD-RAM. There are a number of reserved data areas in any case for the DVD-RAM, so this technology does not represent an obstacle.

In an extension of the invention, provision may be made for providing a plurality of such navigation tables, with the result that the user can decide, as it were, whether he wishes to view the film with advertising interruption or without. Corresponding inputting via a selection menu must be provided in this case.

Next, the temporal sequence of the method according to the invention will be explained in more detail. This is done with reference to FIG. 3. The method starts with the record key 16 and playback key 13 being actuated so that the corresponding programme contribution is recorded. The recording of all the data then takes place in the period between $t_0$ and $t_7$, see FIG. 2. In this case, the operator can end the recording by pressing the stop key 12. Title skipping-back is then executed next, i.e. the read-out unit of the DVD device is positioned at the start of the recorded title. Thus, the forward search is started in the next phase by the key 11 being pressed. The user then actuates the pause key 17 at the beginning of the first advertising block. He then marks this location by pressing the marking key 15. The corresponding cell identification number of the data cell is stored in a buffer store internally in the DVD device. The search then resumes by the key 11 being pressed. Finally, the pause key is actuated again at the beginning of the second film section. The end of the advertising block is then marked using the second marking key 18 and the associated cell number is then stored again in the buffer store. This operation is repeated until all the advertising interruptions have been marked.

The programming key 21 is then actuated in the fourth section. This initiates the function whereby the navigation table is drawn up and subsequently stored at the reserved location provided. In other words, the table is drawn up in such a way that only the data cells comprising no data of the marked advertising blocks are entered. After the function has been implemented, which is confirmed by a corresponding display on the screen of a television set, the method according to the invention is then ended by the end key 12 being pressed.

In the event of the next reproduction, the reproduction then takes place in accordance with the programmed navigation table and advertising interruptions are masked out.

Figure 4:
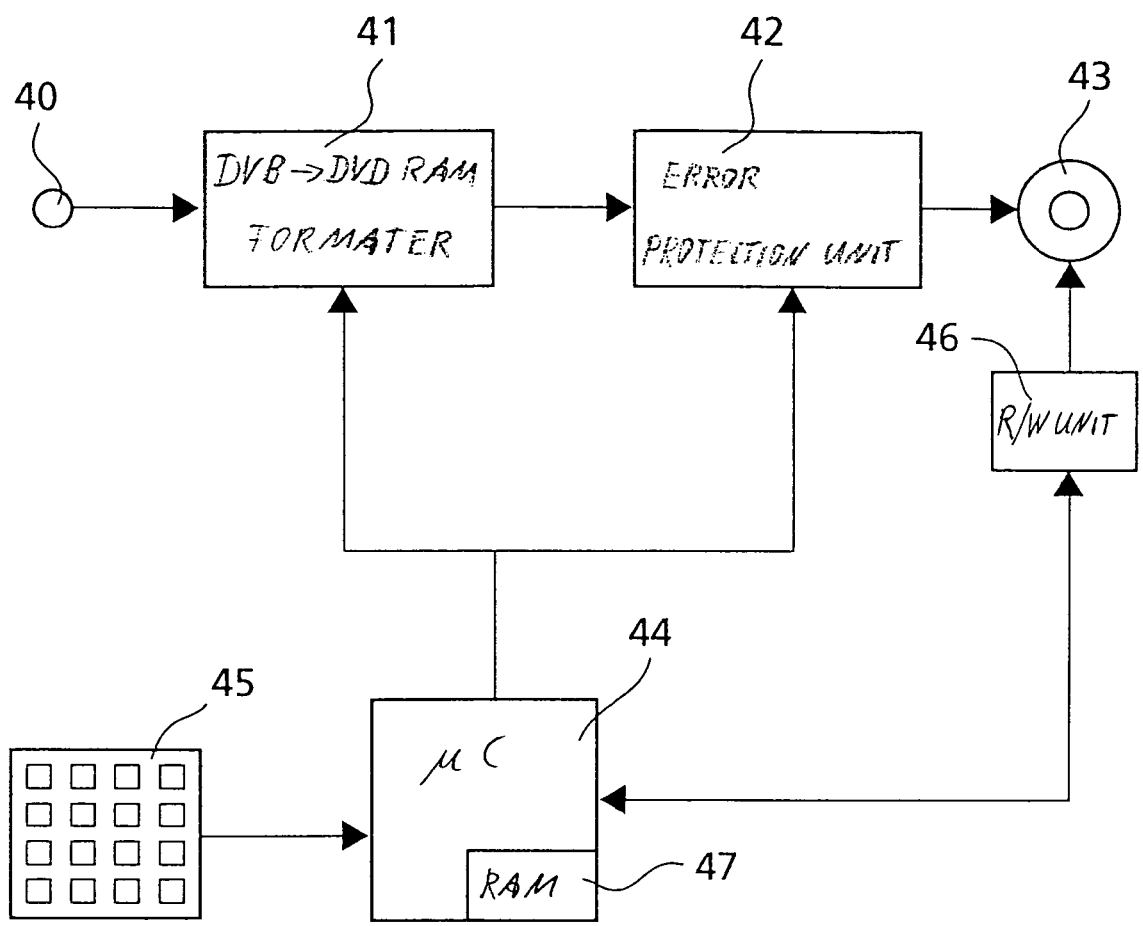
FIG. 4 shows a block diagram with regard to the recording part of the recording and reproduction device.
Figure 5:
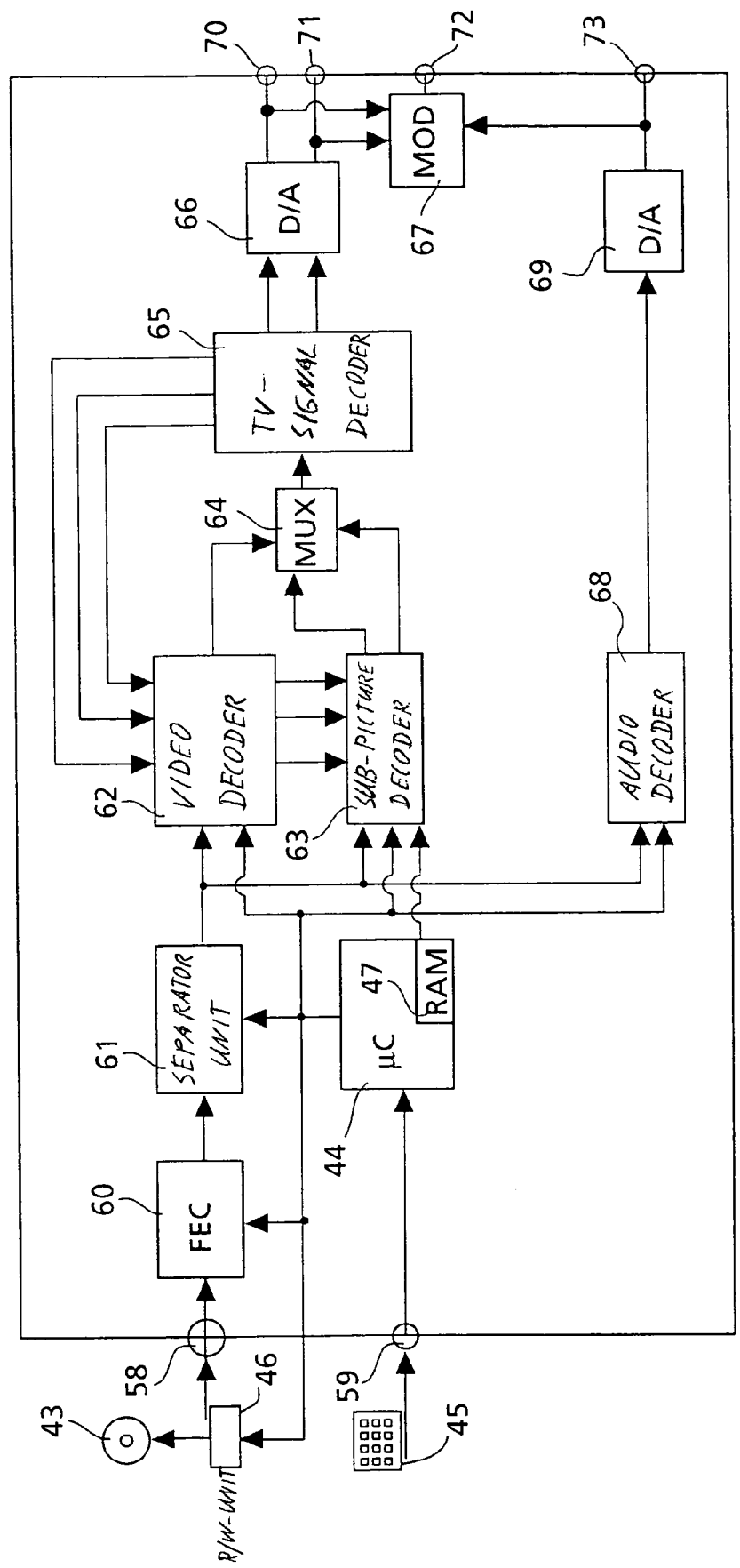
FIG. 5 shows a block diagram of the reproduction part of the recording and reproduction device.

Next, the structure of a recording-reproduction device according to the invention will be described with reference to FIGS. 4 and 5. It should be taken into account here that all the essential components which are regarded as important for the recording function of the device are described in FIG. 4 and all the essential components for the reproduction of the recorded data are illustrated in FIG. 5. Identical reference numerals in FIGS. 4 and 5 in each case designate the same components.

The reference numeral 40 designates a digital input of the recording and reproduction device. The data source is connected thereto. A suitable data source is a DVB receiver, for example. The latter receives the digitally transmitted data of the programme contribution and outputs them again in digital form via an output connected to the input 40. The data of the programme contribution are therefore present in coded form and do not have to be coded anew again in the recording device. However, the data thus received, which still virtually have the DVB format, can be converted into the format for the DVD disc. For this purpose, therefore, it is necessary to provide a unit which is correspondingly programmed and formats the DVB data packets in such a way that they accord with the DVD-RAM format. The unit 41 in the recording and receiving device is provided for this purpose. The logically ordered data are then additionally provided with corresponding error protection in the bit stream formatting unit 42 in a way that is necessary for the DVD-RAM devices. Another process of reformatting may then also be effected therein, with the result that the data are assembled in the correct physical order and can be used directly for recording on the DVD-RAM disc 43.

The reference numeral 45 designates a keypad unit. This is connected to a microcontroller 44. The user can effect inputs via the keypad unit 45. For example, the user will effect the inputs explained above in order to enable the method according to the invention to be processed. Of course, any other inputs are equally possible by this means.

Also connected to the microcontroller 44 is the read-out and writing unit 46. This should also be understood to mean, at the same time, the servo control unit for the rotation of the DVD disc. The microcontroller 44 can specify the location at which data are intended to be read out next. This is important particularly for the reproduction of recorded titles. A volatile memory 47 is provided in the microcontroller 44. The data are buffer-stored in this memory e.g. during the inputting of the data for identifying the beginning and end of an advertising block. At the end of the search, the stored data are used to draw up the navigation table. The navigation table drawn up is then forwarded to the formatting unit 41, where is it is converted in accordance with the data format of the DVD into a data packet which likewise passes through the bit stream formatting unit and is then subsequently stored at the reserved location on the DVD disc.

The block diagram in FIG. 5, where the essential components used in the reproduction of the recorded data are illustrated, is explained below. The reference numeral 58 designates a serial data input. A bit stream is present here which contains both video data and audio data and the data for sub-picture units (in accordance with the DVD standard). The data are supplied from the optical storage disc DVD 43 via the read-out unit 46. The incoming data are then firstly subjected to error detection and correction in a correction unit 60. The data then pass to a separator circuit 61, in which the video, audio and sub-picture data, which are still mixed together, are separated and respectively transferred correspondingly either to a video decoding unit 62, a sub-picture decoding unit 63, or an audio decoding unit 68. The decoded video and sub-picture data are presented to a multiplexing unit 64. The multiplexing unit 64 is controlled by the sub-picture decoding unit 63. At the output of the multiplexing unit 64, the data for the individual pixels of the video picture are successively input into a TV signal decoding device 65. At the outputs of the TV signal encoding device, the standard-conforming luminance and chrominance signals Y, C are output in digital form (PAL, SECAM, NTSC). These signals are subsequently converted into analogue signals in the D/A conversion unit 66 and forwarded to corresponding outputs 70, 71. The associated audio signal is generated in a standard-conforming manner in the decoding device 68 itself and is converted into an analogue audio signal (only a mono signal is illustrated here) in the D/A conversion unit 69. This audio signal is made available at the output 73.

In another design, the audio signal may be output in digital form. This signal must then be processed further in an external decoder.

On the other hand, the design may also be such that the analogue luminance and chrominance signals and the audio signal are modulated onto different carriers in a modulation unit 67 and output as a corresponding video signal via just one output 72.

The reference numeral 59 designates another input for the keypad unit 45. The input may also be designed as an infrared input if the keypad is integrated on a remote control. The microcontroller 44 serves to control the units 46, 60, 61, 62, 63, 68. Once a corresponding selection command has been input, the microcontroller initiates the read-out of the selected navigation table. These data are buffer-stored in the microcontroller, in the memory 47 thereof. The further playback operation is then determined by means of this table. This is done in the manner explained above in conjunction with FIG. 2.

The invention is intended to be used in particular with DVD-RAM video recorders or camcorders. However, it may also be used with corresponding DVD music recording devices. In principle, however, the invention can also be used with other recording and reproduction devices, in particular with tape recording devices.

As an alternative embodiment, the design may also be such that, instead of the navigation table explained, so-called navigation data are provided in a reserved area. Such data are also already provided in the DVD standard, where they are referred to as Navigation commands. These Navigation commands act like jump commands and are then likewise stored in the PGC data area of the DVD.

A further alternative solution consists, moreover, in the fact that additional jump information items are provided in the DVD-RAM standard, which information items can be stored in each case at the start or at the end of a data cell and specify the location at which data cells are to be read out next.

In a further refinement of the invention, resorting of the previously recorded data cells takes place. This is then done with the aid of the buffer-stored information items with regard to the start and end of the individual advertising blocks. The data cells of the advertising blocks are then overwritten by data cells of the recorded programme contribution. As a result, the data cells of the programme contribution are situated in succession in a compactly packed manner and the data cells of the advertising blocks are eliminated.

In the case of this solution, it is also possible to use a second recording device, which is connected to the first recording device and in which a storage medium that has not been written to is then inserted and has only the data cells of the programme contribution written to it. In the case of this solution, it turns out that the invention can also be used in the field of DVD recordable devices, in which it is possible only to write once to a DVD disc.

The invention claimed is:

1. A method for the recording and reproduction of a program contribution, comprising the steps of:
    firstly recording on a storage medium, the program contribution including all program parts, such as advertising blocks;
    subsequently starting of a search for a beginning and end of undesired program parts;
    collecting information items associated with the undesired program parts;
    using the information items to perform re-sorting of recorded data cells on the same storage medium in such a way that the data of the program contribution are situated in succession in a compactly packed manner without the undesired program parts.

2. The method of claim 1, wherein during the re-sorting of the recorded data cells, the data cells occupied by data of the undesired program parts are eliminated by being overwritten with corresponding data of the program contribution.

3. The method of claim 1, wherein measures are taken using splicing tools, which ensure a seamless transition from a video scene prior to masking out of a program part to a subsequent video scene.

4. A method for the recording and reproduction of a program contribution, comprising the steps of:
    firstly recording on a storage medium, the program contribution including all program parts, such as advertising blocks;
    subsequently starting of a search for a beginning and end of undesired program parts;
    collecting information items associated with the undesired program parts; and storing, on the storage medium at the beginning of a specific one of the undesired program parts, the information item associated with the specific undesired program part in the form of jump information specifying a location at which data cells should be read out next to continue the reproduction of the program contribution without interruption by the specific undesired program part.

5. An apparatus for the recording and reproduction of a program contribution with a storage media on which, firstly the program contribution including all program parts, such as advertising blocks, is recorded, the apparatus comprising:

means for carrying out a search for a beginning and end of undesired program parts;

means for storing, on the storage medium at the location of the beginning of a specific one of the undesired program parts, navigation data for identifying the beginning and end of the specific undesired program part; and means for reproducing the program contribution without the undesired program parts.

6. An apparatus for the recording and reproduction of a program contribution with a storage media on which, firstly the program contribution including all program parts, such as advertising blocks, is recorded, the apparatus comprising:

means for carrying out a search for a beginning and end of undesired program parts;

means for storing navigation data for identifying start and end times of the program parts; and means for re-sorting, on the same storage medium, recorded data cells in such a way that the data of the program contribution are situated in succession in a compactly packed manner without the undesired program parts.

* * * * *